Patented Mar. 14, 1939

2,150,552

UNITED STATES PATENT OFFICE 2,150,552

DEWAXING MINERAL OIL

Edwin C. Knowles, Beacon, N. Y., assignor to The Texas Company, New York, N. Y., a corporation of Delaware No Drawing. Application November 18, 1935, Serial No. 50,408

9 Claims. (Cl. 196—18)

This invention relates to the separation of wax from oil.

The invention contemplates a process for dewaxing wax-bearing mineral oil in the presence of a solvent or diluent liquid in which a wax crystal modifying substance comprising a vegetable wax, such as montan wax, is added to the oil or to a mixture of the oil and solvent. The resulting mixture of oil, modifying substance and solvent is then heated to an elevated temperature prior to chilling. Thereafter the mixture is chilled to precipitate the wax and the wax thus precipitated is separated by mechanical means such as filtration, centrifuging or settling.

The present application is a continuation-in-part of my pending application Serial No. 41,393, filed September 20, 1935, for Dewaxing mineral oil.

The present invention concerns a specific modification of the broad invention therein disclosed, namely, the addition of a wax crystal modifying material such as montan wax to the oil, particularly relatively low viscosity lubricating oils, prior to dewaxing in accordance with the process of my invention.

The wax crystal modifying material may comprise montan wax in its natural state or it may comprise constituents thereof such as that portion of montan wax which is soluble in a solvent mixture consisting of 40% methyl ethyl ketone and 60% benzol, at a temperature of 70° F. and using four parts of the solvent mixture to one part of the montan wax.

In my above mentioned pending application, I have disclosed a novel process of dewaxing oil which comprises mixing the wax-bearing oil with a solvent such as a mixture of 35% acetone and 65% benzol and heating the mixture of oil and solvent to a temperature in the range of 125 to 175° F. prior to chilling. The heated mixture is then chilled to a temperature of 0° F. and below in order to precipitate the wax. The wax constituents thus precipitated are removed by filtration or other means.

I have found that heating a mixture of viscous wax-bearing oil and a selective solvent of the above character to a temperature of from 15 to 50° F. above the minimum temperature at which the wax and oil appear to be completely dissolved in the solvent has a beneficial effect upon the crystalline structure of the wax precipitated upon chilling, so that the wax is more readily separated from the mixture and can be more rapidly filtered therefrom. As a consequence the filter rates by my process may be increased very greatly over the rate obtaining in the ordinary dewaxing procedure where the preliminary heating step is omitted.

Viscous wax-bearing oils, oils having a Saybolt Universal viscosity of above about 80 seconds at 210° F. apparently contain naturally occurring asphaltic constituents which partake of the nature of a wax crystal modifying substance under certain conditions. These constituents are believed to be less soluble than wax in the dewaxing solvent liquid and at the minimum temperature at which the wax-bearing oil appears to be in complete solution, these constituents are probably present as a colloidal solution rather than in true solution.

When present in colloidal form these constituents possibly form films on the small plate type paraffin crystals, formed during preliminary precipitation of wax from the solution, and these films inhibit the normal transformation of the plate type wax crystals into the more easily filterable type of crystals.

It is believed that upon heating the mixture of oil and solvent this colloidal material or wax crystal modifying material is completely dissolved in the solution. Upon chilling the thus heated solution, this material precipitates from the solution substantially coextensively with the wax in the form of nuclear particles which facilitate crystallization of the wax in a more readily separable and filterable form. It is thought that the optimum effect is realized when the modifying substance continues to precipitate from the solution over the entire range of wax crystallization.

This minimum temperature at which the wax-bearing oil appears on visual inspection to be completely soluble in the dewaxing solvent or in homogeneous mixture therewith, depends upon the nature of the oil as well as upon the solvent. With a dewaxing solvent of the character of a mixture of acetone and benzol, such as referred to above, the minimum temperature of apparent complete solution may range from around 100 to 125° F., the minimum temperature for relatively viscous oils being in the upper portion of this temperature range.

With a selective type of solvent, the temperature to which the mixture is heated prior to chilling ranges from about 125 to 175° F. With a diluent type of solvent such as a petroleum naphtha somewhat higher temperatures are desirable as for example in the range of 140 to 190° F. and preferably around 160° F.

I have discovered that the foregoing process is applicable to the dewaxing of relatively less viscous oils when a modifying substance such as montan wax is added to the oil and that by so doing improved filtration rates as well as increased yields of wax-free oil, and of paraffin in the slack wax are realized.

The present invention therefore has particular reference to the dewaxing of wax-bearing oils having a Saybolt Universal viscosity up to about 75 seconds at 210° F. These oils appear to be deficient in the naturally occurring constituents present in the relatively more viscous oils mentioned above. However, I have found that in certain instances it may also be advantageous to add a small amount of wax crystal modifying material to the relatively viscous oils and thereby improve the filter rate and yields.

My invention therefore comprises incorporating a relatively small amount, namely about 0.1% to 1.0% of montan wax or constituents derived from montan wax, in the wax-bearing oil or in a mixture of the wax-bearing oil and dewaxing solvent, and then prior to chilling, heating the mixture of oil and montan wax and solvent to a temperature in the range 125 to 190° F. and which is from 15 to 90° above the minimum temperature at which the wax and oil appear to be in complete solution in the solvent.

The modifier may be added to the wax-bearing oil before or after mixing with the solvent. It may also be added in the form of a gel made by mixing the montan wax with some relatively low viscosity lubricating oil and applying heat thereto.

In order to further illustrate the invention, reference will now be made to the following experiments in which a wax distillate derived from Mid-Continent crude and after being extracted with a solvent comprising furfural, was dewaxed. This distillate had the following characteristics:

| | |
|---|---|
| Gravity A. P. I | 28.3 |
| Flash °F | 500 |
| Pour °F | 115 |
| Per cent paraffin (145–6° F. melting point) | 10.4 |
| Saybolt Universal viscosity at 210° F | 69–70 |

In each instance this oil was dewaxed with a solvent consisting of 50% methyl ethyl ketone and 50% isopropyl ether, using four parts of solvent mixture to one part of oil.

In each instance montan wax in the amounts indicated was added to a mixture of the oil and solvent and heated to the temperatures shown, prior to chilling. Thereafter the mixture was chilled to a temperature of 0° F. and filtered at that temperature producing a filtrate which after removal of the solvent had a pour test of around 10° F.

The chilling and filtering steps were carried out in apparatus and in a manner similar to that described in my pending application previously referred to. During the chilling step the mixture was subjected to relatively mild agitation by bubbling inert gas through the mixture. The filter cake obtained in each case was not subjected to washing.

| Percent montan wax by weight wax-bearing oil | Solution temperature, °F. | Filter rate* | Percent yield wax-free oil | Percent paraffin in slack wax |
|---|---|---|---|---|
| Runs without montan wax ||||| 
| 0.0 | 108 | 5.6 | 55 | 26.5 |
| 0.0 | 170 | 11.0 | 56.5 | 28.5 |
| Runs with montan wax ||||| 
| 0.23 | 115 | 15.6 | 66 | 30.5 |
| 0.23 | 165 | 46 | 78 | 51.5 |
| 0.5 | 165 | 40 | 77.5 | 52 |
| Runs with purified montan wax** ||||| 
| 0.5 | 170 | 40 | 76 | 46.5 |

*Gallons wax-free oil per square of filtering surface per hour based on time required to filter 0.2 gallon per square foot of filter surface.
**Soluble portion in 40% methyl ethyl ketone and 60% benzol using 4 parts of solvent to 1 part of wax at 70° F.

As indicated from the foregoing tabulation the effective concentration of montan wax in the wax-bearing oil is quite low, namely around 0.23% by weight of wax-bearing oil or approximately 0.72 pounds per barrel of wax distillate. These results indicate that the addition of a small amount of montan wax to a wax-bearing fraction of the above character followed by heating of the mixture prior to chilling results in increasing the filter rate about four times over that possible in the absence of the added modifying substance. Also the yield of wax-free oil is increased by 15 to 20%. The volume of wax cake is also reduced by about 50%.

The invention is applicable to dewaxing with different dewaxing solvents, either selective solvents such as a mixture of acetone and benzol or a diluent type of solvent such as naphtha or a relatively low boiling petroleum fraction.

Suitable selective solvents may comprise aliphatic ketones such as acetone and methyl ethyl ketone mixed with benzol and its homologs; mixtures of a low molecular weight ketone and a high molecular weight ketone such as methyl ethyl ketone and dipropyl ketone; a mixture of an aliphatic ether and an aliphatic ketone such as that used in the specific examples described above; petroleum fractions suitable as solvents may comprise hydrocarbons such as propane, butane, pentane etc., up to nonane or mixtures thereof. Petroleum fractions may be used alone or in conjunction with a wax anti-solvent liquid such as acetone and methyl ethyl ketone.

The ratio of dewaxing solvent to wax-bearing oil may vary from that shown above, as for example from one to six parts of solvent to one part of oil may be used, if desired. I have found that excellent results are obtained with comparatively low ratios, that is from one to two parts of solvent to one part of oil. Moreover, with these low ratios superior results are in many instances obtained by the process of my invention as compared to those realized by prior art methods when using higher dilution ratios.

Furthermore, the invention is applicable to the dewaxing of residual as well as distillate wax-bearing petroleum fractions. While it is particularly adapted to the dewaxing of oils having a viscosity of below 80 seconds at 210° F., nevertheless, as already indicated, it may be applied advantageously in the case of more viscous oils.

Obviously many modifications and variations of the invention, as hereinbefore set forth, may be made without departing from the spirit and scope thereof and therefore only such limitations should be imposed as are indicated in the appended claims.

I claim:

1. The method of dewaxing wax-bearing mineral lubricating oil having a Saybolt Universal viscosity of up to about 75 seconds at 210° F. which comprises mixing the oil with a dewaxing solvent liquid, incorporating therewith around 0.23% of montan wax by weight of the wax-bearing oil, heating the mixture to a temperature of around 160° F., chilling the heated mixture to a temperature of the order of 0° F. and below to precipitate wax constituents therefrom, removing the wax constituents thus precipitated, and removing the solvent from the dewaxed oil.

2. The method of dewaxing wax-bearing mineral oil which comprises mixing the oil with a solvent liquid, incorporating in the oil a small amount of montan wax, heating the mixture containing the incorporated montan wax to a temperature of around 160° F., chilling the mixture to precipitate solid hydrocarbons, and removing therefrom the solid hydrocarbons so precipitated.

3. The method of dewaxing wax-bearing mineral oil which comprises mixing the oil with a selective solvent, incorporating in the oil about 0.1% to 1.0% of montan wax by weight of the wax-bearing oil, heating the mixture containing the incorporated montan wax to a temperature in the range 140° F. to 190° F. and substantially above the temperature of solution of the wax-bearing oil in the solvent, chilling the mixture to a temperature of around 0° F. and below to precipitate solid hydrocarbons, and removing the solid hydrocarbons so precipitated.

4. The method of dewaxing a wax bearing mineral oil which comprises mixing the oil with a selective solvent having substantially complete selective action as between wax and oil at about 0° F., incorporating in the mixture in small amount ingredients of crude montan wax having wax crystal modifying properties, heating the mixture to a temperature substantially above the minimum temperature of apparent complete solution of oil and wax in the solvent and such that upon chilling to about 0° F. and filtering, a wax cake is secured having a bulk not more than about half the bulk secured by heating only to about said apparent solution temperature, chilling the mixture to a temperature of 0° F. and below, and filtering out the wax thus precipitated.

5. The method of dewaxing a wax-bearing mineral lubricating oil which comprises mixing the oil with a solvent of such character and in such proportion with the oil that the wax and oil appear to be completely dissolved in the solvent at a temperature of 125° F., incorporating in the mixture in small amount ingredients of crude montan wax having wax crystal modifying properties, heating the mixture to an elevated temperature substantially above the aforesaid solution temperature such that the oil and wax remain completely dissolved therein at said elevated temperature and such that upon chilling to around 0° F. and filtering to remove the wax, the rate of filtration is several times as rapid as that secured where the mixture is heated only to about said minimum solution temperature, chilling the heated mixture to a temperature around 0° F. and below, and filtering out the wax thus precipitated.

6. The method of dewaxing a wax-bearing mineral lubricating oil which comprises mixing the oil with a solvent of such character and in such proportion with the oil that the wax and oil appear to be completely dissolved in the solvent at a temperature of 125° F., incorporating in the mixture in small amount ingredients of crude montan wax having wax crystal modifying properties, heating the mixture to a temperature about 50° F. above the aforesaid solution temperature such that the oil and wax remain completely dissolved in the heated mixture and such that upon chilling to around 0° F. and filtering to remove the wax, the rate of filtration is several times as rapid as that secured where the mixture is heated only to about said minimum solution temperature, chilling the heated mixture to a temperature around 0° F. and below, and filtering out the wax thus precipitated.

7. The method according to claim 5 in which the solvent is a selective solvent having substantially complete solvent action on the liquid constituents of the oil and substantially no solvent action upon the solid hydrocarbon constituents of the oil at a temperature of around 0° F. and below.

8. The method of dewaxing wax-bearing mineral oil which comprises mixing the oil with a solvent liquid, incorporating in the oil in small amount ingredients of crude montan wax having wax crystal modifying properties, heating the mixture containing the montan wax to a temperature of about 160° F., chilling the mixture to precipitate solid hydrocarbons, and filtering the chilled mixture to remove the solid hydrocarbons so precipitated.

9. The method of dewaxing wax-bearing mineral oil which comprises mixing the oil with a solvent liquid, incorporating in the oil about 0.1% to 1.0% of crude montan wax by weight of the wax-bearing oil, heating the mixture containing the montan wax to a temperature in the range 140° F. to 190° F. and substantially above the temperature of solution of the wax-bearing oil in the solvent, chilling the mixture to a temperature of around 0° F. and below to precipitate solid hydrocarbons, and filtering the chilled mixture to remove the solid hydrocarbons so precipitated.

EDWIN C. KNOWLES.